United States Patent [19]
Mooney et al.

[11] 3,919,580
[45] Nov. 11, 1975

[54] RELATIVISTIC ELECTRON BEAM GENERATOR

[75] Inventors: Leonard J. Mooney, Livermore; Hugh M. Hyatt, Berkeley, both of Calif.

[73] Assignee: The United States of America as represented by the United States Energy Research and Development Administration, Washington, D.C.

[22] Filed: Sept. 11, 1974

[21] Appl. No.: 504,933

[52] U.S. Cl. ............... 313/310; 313/336; 313/446; 313/454; 328/227
[51] Int. Cl.² .......................................... H01J 1/30
[58] Field of Search .......... 313/446, 452, 454, 455, 313/336, 57, 310; 328/228, 227

[56] References Cited
UNITED STATES PATENTS

| | | | |
|---|---|---|---|
| 3,345,528 | 10/1967 | Bryant, Jr. | 313/455 |
| 3,489,944 | 1/1970 | Denholm et al. | 313/336 |
| 3,510,713 | 5/1970 | Bennett | 313/57 |
| 3,700,945 | 10/1972 | Friedman | 315/3.5 |
| 3,720,828 | 3/1973 | Nablo | 328/228 |
| 3,817,592 | 6/1974 | Swanson | 313/336 |

*Primary Examiner*—Saxfield Chatmon, Jr.
*Attorney, Agent, or Firm*—Dean E. Carlson; Frederick A. Robertson; L. E. Carnahan

[57] ABSTRACT

A relativistic electron beam generator for laser media excitation employing a diode type relativistic electron beam source having a cathode shaped such as to provide a rectangular output beam with uniform current density.

7 Claims, 6 Drawing Figures

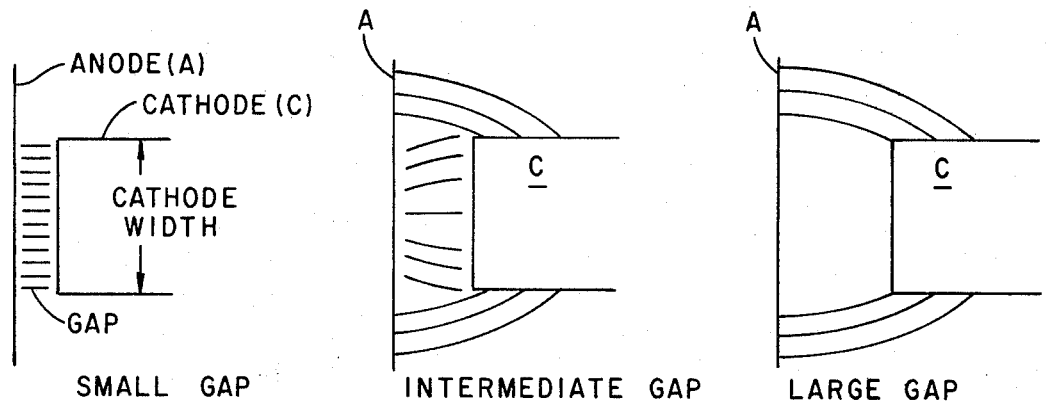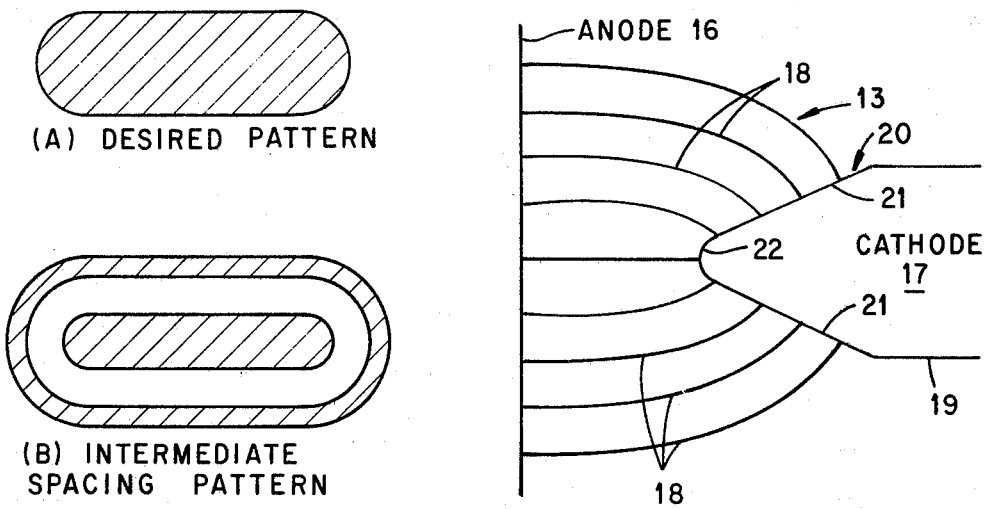

3,919,580

RELATIVISTIC ELECTRON BEAM GENERATOR

BACKGROUND OF THE INVENTION

The invention described herein was made in the course of, or under, Contract No. W-7405-ENG-48 with the United States Atomic Energy Commission.

The invention relates to electron beam generators, particularly to such generators for gas or liquid laser excitation, and more particularly to an electron beam generator employing a diode type relativistic electron beam source having a shaped cathode for producing a rectangular output beam.

The power output of gas lasers is directly proportional to the size of the excitation area of the chamber which encloses the lasing gas, measured along the resonant path of the generated laser light. Various means, including electron beam generators have been utilized to excite the gaseous lasing medium, such prior electron beam activated laser systems are exemplified by U.S. Pat. Nos. 3,641,454 issued Feb. 8, 1972, and 3,789,321 issued Jan. 29 1974. An electron beam excited gas laser requires an electron beam source output sized and shaped such as to coincide with its excitation area. Furthermore, electron beam excited gas lasers are sensitive to nonuniformity of the exciting electron beam. Thus, the electron beam source to be employed must be capable of producing an output beam of uniform current desnity over the excitation area of the gas laser.

While diode type electron beam sources are known in the prior art, such as the so-called Pierce Gun, the cathode is normally rectangularly shaped and beam shaping is achieved by electromagnetic field producing structures placed between the cathode and anode.

SUMMARY OF THE INVENTION

The present invention is a relativistic electron beam source which satisfies the above-stated requirements, and comprises a diode type electron beam source which overcomes the above noted disadvantages and is composed of a contoured cathode and a flat, thin anode substantially transparent to the electrons emitted from the cathode. The contoured shape of the cathode, derived from mathematical analysis, results in a rectangularly shaped electron beam orthogonal to the plane of the anode (i.e., there is minimal transverse electron energy), and having very uniform density.

Therefore, it is an object of this invention to provide a relativistic electron beam source particularly adapted for gas laser excitation.

A further object of the invention is to provide a diode type relativistic electron beam source.

Another object of the invention is to provide an electron beam source of the diode type employing a cathode contoured to provide a rectangular output beam with uniform current density.

Another object of the invention is to provide a relativistic electron beam generator for gas laser excitation employing a diode type source including a contoured cathode and a flat, thin anode resulting in a rectangularly shaped electron beam orthogonal to the plane of the anode, and having very uniform current density.

Other objects of the invention will become readily apparent from the following description and accompanying drawings.

BRIEF DESCRIPTION OF THE DRAWINGS

FIGS. 2-4 illustrate different operating regimes for variations in anode-cathode gap spacing;

FIG. 5 illustrates a comparison of a desired beam patttern and that obtained with intermediate gap spacing of FIG. 3; and FIG. 6 illustrates a diode type electron beam source constructed in accordance with the invention.

DESCRIPTION OF THE INVENTION

Figure 1:
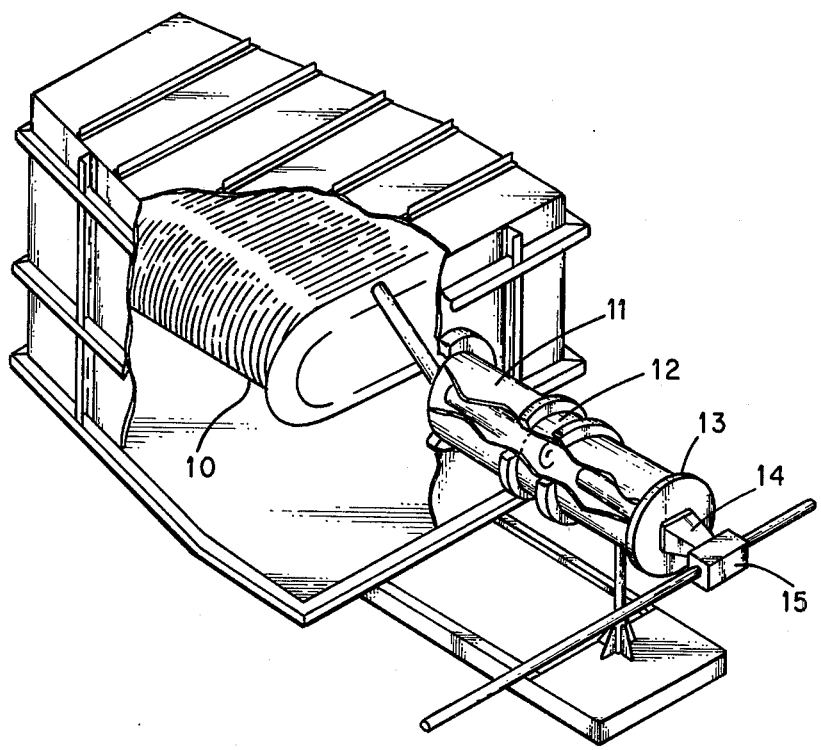
FIG. 1 is a partial cutaway view of an electron beam generator incorporating the diode type relativistic electron beam source of the invention.

This invention is directed to a diode type relativistic electron beam source particularly adapted for excitation of gaseous lasing media although effective for excitation of liquid lasing medium. The electron beam source employs a contoured cathode and a thin, flat anode substantially transparent to electrons emitted from the cathode. The diode source is mounted in an electron beam generator actuated by a Marx bank, with the output of the diode source being directed into a laser cavity containing gaseous lasing media. The contoured shape of the cathode, derived from mathematical analysis, results in a rectangularly shaped electron beam orthogonal to the plane of the anode (i.e., there is minimum transverse electron energy) and having very uniform current density.

The electron beam generator, incorporating the diode type high-current-density electron beam source, illustrated in FIG. 1 is of the megavolt type and the diode source thus is referred to hereinafter as a megavolt electron gun (MEG). These MEG diodes can provide rectangular beams over areas in excess of 150 cm$^2$ at 1–2 MeV with current densities of several kA/cm$^2$ in a 50 nsec pulse. For example, the MEG can provide a 2-by-10 cm to a 2-by-50 cm beam, the former being used, for example, to study the scaling properties of the ultra-violet (uv) excimer (Xe$_2$* and Kr$_2$*) lasers and the constraints imposed by optical material, in order to determine the utility of vacuum-uv lasers and vacuum-uv spontaneous emission source for laser excitation; with the latter, for example, being applied to investigate traveling wave excitation techniques and visible excimer systems.

As pointed out above, an important aspect of laser systems involving direct injection of relativistic electron beams into a gaseous lasing media for excitation of the media is the need to control and characterize the beam properties in the medium of interest. Generation, propagation, and extraction of uniform rectangular beams utilizing the diode electron source of this invention have been accomplished, wherein uniform beams 2 by 10 cm with greater than 90 percent uniformity at 1 MeV and 3 kA/cm$^2$ have been generated by employing a convex contoured graphite cathode, as shown in FIG. 6, which controls and utilizes shank emission. By proper selection of anode materials and thickness, described in detail hereinafter, anode lifetimes in excess of 20 shots at 3–5 kA/cm$^2$ have been achieved. The beam is transported to the laser chamber using vacuum coax and neutral-gas drift tubes, for example.

Referring now to FIG. 1, the embodiment of the MEG electron beam generator generally comprises a Marx bank (capacitor bank) 10, a pulse forming line 11, a switch 12, and a diode source 13 from which an electron beam indicated at 14 is directed into a laser cavity 15, which, for example, may contain $Xe_2$, $Kr_2$, or other gaseous lasing media. Since the details of the components of the FIG. 1 apparatus, except for diode 13, do not constitute part of this invention and are known in the art, further description thereof is deemed unnecessary. A detailed description of the diode electron beam source is set forth hereinafter with respect to FIG. 6. Nominal characteristics of the FIG. 1 embodiment are, for example, 1 MeV, 100 kA, and 50 nsec pulse with (FWHM). Jitter from trigger to output is <8 nsec; reproducibility is >95 percent.

The design of the diode source 13 involves several factors. The cathode-anode gap spacing is determined to be ~ 1 cm, for a 2-by-10 cm beam, by Child's law (i.e., space-charge-limited operation). The impedance (Z) is then given by:

$$Z = \left(\frac{433}{V^{1/2}}\right)\left(\frac{d^2_{eff}}{A_{beam}}\right)$$

where V is in MV, Z is in ohms, A is area of beam at the anode plane, d is distance between cathode and anode, and the factor $d_{eff}$ includes the effects of gap closure due to plasma motion generated by cathode whisker explosions (traveling with a velocity $\approx 2 \times 10^6$ cm/sec) and plasma motion emanating from the anode (velocity $\approx 2\text{-}6 \times 10^6$ cm/sec).

At a 1 cm cathode-anode gap both end and shank emission of the cathode can be important. FIGS. 2–4 show the regions of operation, which depend on the aspect ratio of gap between anode (A) and cathode (C) to cathode width. With the small aspect ration (FIG. 2) a planar geometry is approximated, and end emission dominates, producing a uniform beam. With a large aspect ratio (FIG. 4) a needle geometry is approximated, and shank emission dominates, producing a hollow beam. At intermediate spacings (FIG. 3), both end and shank emission occur, producing a uniform central beam with a halo separated (as dictated by space charge at the corners) by a low density region; the energy is approximately equally distributed in the central region and the halo as more clearly seen in FIG. 5 wherein a desired pattern (a) is compared with an intermediate spacing pattern (b) produced by the FIG. 3 anode-cathode gap arrangement. In all cases the J(beam current density) X B(self-magnetic field of beam) self-force causes curvature of the trajectories, as shown in FIG. 3.

To generate a uniform beam so as to most effectively utilize both end and shank emission, suppression of the shank emission can be attempted by oiling and controlling shank field, or by contouring the cathode in order to fold the end and shank emission together. Contouring of the cathode effectively reduces the space charge buildup at the corners, as shown in FIG. 6, and substantially eliminates the curvature of the trajectories, described above, caused by the JXB self-force. By tests conducted on a cathode having 2-by-10 cm cross section and contoured as in FIG. 6, and a current density of 3 kA/cm², the nonuniformity at the anode plane was less than 8 percent, and that a low electron transverse energy was obtained.

As shown in FIG. 6, the diode source 13 of FIG. 1 comprises an anode 16 and a cathode 17 spaced ~ 1 cm from anode 16 with emission lines therebetween indicated at 18. Anode 16 is of a flat, thin configuration substantially transparent to the electrons emitted from the cathode 17, and, for example, constructed of titanium, stainless steel, or aluminized mylar having a thickness of 0.0005 inch to 0.005 inch and a radius such that it is larger than the largest dimension of the beam. Cathode 17 may, for example, be constructed of graphite, or brass with Aquadag, having a body portion 19 with a cross-section in the range from 2-by-10 cm to 2-by-50 cm, and a convex configured end portion 20 defining a smooth substantially parabolic surface with, for example, two tapered converging side surfaces 21 at an angle of 20° to 40° (30° being shown) and a rounded tip or crown 22 of a radius from ⅛ inch to ½ inch (radius of 9/32 inch shown). While not shown, diode source 13 is operatively connected electrically with a capacitor discharge system such as Marx bank 10 of FIG. 1. As pointed out above the contoured shape of the cathode results in a rectangularly shaped electron beam orthogonal to the plane of the anode (i.e., there is minimal transverse electron energy), and having very uniform current density.

Anode survival is a critical factor in the performance of the electron beam machines since each anode failure necessitates the cleaning of the diode. Anode failures are generally attributed to poor rise and fall times and postpulse ringing. Tests conducted thus far on the FIG. 6 diode source provided at least 20 shots before anode rupture, thus substantially reducing the machine downtime.

As illustrated in FIG. 1, the diode 13 is positioned in spaced relation with laser cavity 15, thus the electron beam 14 must traverse this distance, which, for example, is about 30 cm. Thus, means, which do not constitute part of this invention, must be provided to efficiently deliver the beam from the diode to the laser cavity. As pointed out above, two methods have been proposed for this function; (1) transport in a vacuum coax by extending the cathode shank inside a "hat," or (2) transporting the beam in neutral gas, i.e., $N_2$ at ~ 1 Torr. The first approach has the problem that shank emission to the coax walls is a loss unless good magnetic insulation is obtained, while the second approach has the drawbaack that unless the electrons have low relative transverse energy in a rectangular guide, spiraling caused by the electron angular momentum forces the beam to exit the guide as a round beam having a diameter equal to the smallest guide dimension.

The vacuum coax configuration has been tested with the above described diode electron beam source of this invention, it being found that the shank emission loss problem could be minimized or eliminated. The neutral-gas drift technique has also been tested wherein a 3 kA/cm² beam generated at the anode plane was drifted with 80–90 percent efficiency in a distance of 30 cm while maintaining the high degree of beam uniformity above described. Thus, the diode source of the present invention is compatible with both of the above-described beam transport techniques, whereby the maximum beam energy in the desired beam configuration reaches the laser cavity for excitation of the gaseous lasing media contained therein for producing a population inversion on the media and lasing thereof.

It has thus been shown that the present invention provides a diode type relativistic electron beam source for an electron beam generator particularly adapted for gas laser excitation, the diode source employing a cathode shaped such as to provide a rectangular output beam with uniform current density.

While particular embodiments of the invention have been illustrated and/or described, modifications and changes will become apparent to those skilled in the art, and it is intended to cover in the appended claims all such modifications and changes as come within the spirit and scope of the invention.

What we claim is:

1. In an electron beam generator for gas laser excitation, the improvement comprising: a diode type relativistic electron beam source composed of a thin, flat anode and a convex contoured cathode, said convex contoured cathode having a body portion defining a rectangular cross-section, and a convex contoured end portion of a cross-section no greater than that of said body portion shaped such as to provide a substantially rectangular output beam with uniform current density, said cathode body portion having a rectangular cross-section in the range from 0.5-by-10 cm to 2-by-50 cm, said convex contoured end portion of said cathode defining a smooth substantially parabolic surface composed of a pair of converging tapered surfaces and a curved crown interconnecting said tapered surfaces, said tapered surfaces defining an angle of about 20° to 40° with respect to a longitudinal axis of said cathode, and said curved crown having a radius of ⅛ inch to ½ inch, said contoured cathode being positioned with respect to said anode so as to produce a rectangularly shaped electron beam orthogonal to the plane of said anode.

2. The diode type relativistic electron beam source defined in claim 1, wherein said anode is constructed of material substantially transparent to electrons emitted from said cathode.

3. The diode type relativistic electron beam source defined in claim 2, wherein said anode has a thickness of 0.0005 inch to 0.005 inch and a radius larger than the largest beam dimension.

4. The diode type relativistic electron beam source defined in claim 1, wherein said convex configured cathode is constructed of material selected from the group consisting of graphite, and brass with Aquadag.

5. The diode type relativistic electron beam source defined in claim 1, wherein said tapered surfaces define an angle of about 30° with respect to a longitudinal axis of said cathode, wherein said curved crown has a radius of about 9/32 inch, and wherein said body portion of said cathode has a rectangular cross-section of about 2-by-10 cm.

6. The diode type relativistic electron beam source defined in claim 5, wherein said cathode is constructed of graphite and positioned about 1 cm from said anode, and wherein said anode is constructed of titanium.

7. The diode type relativistic electron source defined in claim 6, wherein said anode has a thickness of about 0.003 inch.

* * * * *